(12) United States Patent
Reasoner et al.

(10) Patent No.: US 7,057,847 B2
(45) Date of Patent: Jun. 6, 2006

(54) MEDIA STORAGE SYSTEMS AND CARTRIDGE-HANDLING APPARATUS THEREFOR

(75) Inventors: Kelly John Reasoner, Fort Collins, CO (US); Robert Wesley Luffel, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 401 days.

(21) Appl. No.: 10/197,946

(22) Filed: Jul. 16, 2002

(65) Prior Publication Data

US 2004/0012877 A1    Jan. 22, 2004

(51) Int. Cl.
G11B 21/08    (2006.01)
G11B 7/85    (2006.01)

(52) U.S. Cl. ...................................... 360/92; 369/30.43
(58) Field of Classification Search ................. 360/92, 360/98.01, 98.04–98.06, 99.01; 369/30.06, 369/30.38–30.39, 324, 30.4–30.41, 30.43, 369/30.45, 30.47, 30.49, 30.63
See application file for complete search history.

(56) References Cited

U.S. PATENT DOCUMENTS

| | | | | |
|---|---|---|---|---|
| 2,918,656 A | | 12/1959 | Nolde et al. | |
| 4,275,425 A | * | 6/1981 | Watanabe et al. | 360/92 |
| 4,675,856 A | * | 6/1987 | Rudy et al. | 369/30.41 |
| 4,742,405 A | * | 5/1988 | Teranishi | 360/92 |
| 5,010,536 A | | 4/1991 | Wanger et al. | |
| 5,043,962 A | | 8/1991 | Wanger et al. | |
| 5,101,387 A | | 3/1992 | Wanger et al. | |
| 5,133,632 A | * | 7/1992 | Aramaki et al. | 414/283 |
| 5,277,534 A | * | 1/1994 | Anderson et al. | 414/281 |
| 5,293,284 A | | 3/1994 | Sato et al. | |
| 5,631,785 A | * | 5/1997 | Dang et al. | 360/92 |
| 5,790,338 A | * | 8/1998 | Kanai et al. | 360/71 |
| 6,041,026 A | * | 3/2000 | Hammar et al. | 369/30.43 |
| 6,064,544 A | * | 5/2000 | Wada | 360/92 |
| 6,327,113 B1 | | 12/2001 | Mueller et al. | |
| 6,496,325 B1 | * | 12/2002 | Kersey et al. | 360/92 |
| 6,751,048 B1 | * | 6/2004 | Ostwald et al. | 360/92 |
| 6,754,037 B1 | * | 6/2004 | Ostwald et al. | 360/92 |
| 2001/0013990 A1 | | 8/2001 | Ostwald et al. | |

FOREIGN PATENT DOCUMENTS

| | | |
|---|---|---|
| GB | 2 365 200 | 2/2002 |
| JP | 1-243264 | 9/1989 |

* cited by examiner

Primary Examiner—Angel Castro (57) ABSTRACT

Cartridge-handling apparatus for a media storage system. One embodiment comprises a carriage and a translate frame pivotally mounted to the carriage. A rotational drive system is operatively associated with the carriage, the rotational drive system rotating the translate frame about a y-axis in the media storage system. At least one cartridge-engaging assembly is mounted in the translate frame.

26 Claims, 8 Drawing Sheets

MEDIA STORAGE SYSTEMS AND CARTRIDGE-HANDLING APPARATUS THEREFOR

FIELD OF THE INVENTION

The invention generally pertains to media storage systems, and more specifically, to media storage systems and cartridge-handling apparatus therefor.

BACKGROUND OF THE INVENTION

Media storage systems, or autochangers, are commonly used to store data cartridges at known locations and to retrieve the desired data cartridges so that data may be written to and/or read from the data cartridges. Accordingly, large volumes of computer-readable data can be stored on numerous data cartridges and accessed by a single computer or by multiple computers connected to the media storage system over a network.

Such media storage systems may include one or more storage magazines and cartridge read/write devices. The storage magazines serve as storage locations for the data cartridges, and the read/write devices may be used to read and/or write data on the data cartridges. The media storage system may also include a cartridge-engaging assembly, as well as a drive system for moving the cartridge-engaging assembly among the data cartridges stored in the media storage system. For example, if a certain data cartridge is to be read, a control system causes the cartridge-engaging assembly to move to the location of the desired data cartridge. Then, the cartridge-engaging assembly retrieves the data cartridge and delivers it to the cartridge read/write device where the user can access the data thereon. The control system may also cause the cartridge-engaging assembly to return the data cartridge to the storage magazine following the read/write operation.

The storage magazines and read/write device(s) may be arranged within the media storage system in a generally U-shaped configuration. That is, the storage magazines are arranged opposite to and facing one another (i.e., each defining one "leg" of the U-shaped arrangement), and the read/write device(s) are arranged between the storage magazines in orthogonal relation thereto.

Accordingly, the cartridge-engaging assembly must be moved, or "walked", around the U-shaped path to access and transport data cartridges between the storage magazines and the read/write device(s). In some instances, this can be a time-consuming process. For example, the cartridge-engaging assembly may be "parked" on one leg of the U-shaped path in the media storage system when it receives a request to retrieve a data cartridge that is located in a storage magazine on the other leg of the U-shaped path. Therefore, the cartridge-engaging assembly must be moved along the U-shaped path past the read/write device to the other leg of the U-shaped path so that it can retrieve the desired data cartridge from the storage magazine. After retrieving the data cartridge, the cartridge-engaging assembly must be moved back along the U-shaped path to deliver the data cartridge to the read/write device.

SUMMARY OF THE INVENTION

An embodiment of a Cartridge-handling apparatus for a media storage system comprises a carriage and a translate frame pivotally mounted to the carriage. A rotational drive system is operatively associated with the carriage, the rotational drive system rotating the translate frame about a y-axis in the media storage system. At least one cartridge-engaging assembly is mounted in the translate frame.

BRIEF DESCRIPTION OF THE DRAWINGS

Illustrative and presently preferred embodiments of the invention are shown in the drawings, in which.

DETAILED DESCRIPTION

Cartridge-handling apparatus 10 (FIG. 1) as it may be used in a media storage system 12 is shown and described herein according to embodiments of the invention. Briefly, the media storage system 12 (FIG. 1) may comprise one or more storage magazines 16, one or more read/write devices 18, and a cartridge-handling apparatus 10. The cartridge-handling apparatus 10 is mounted between the storage magazines 16 and the read/write device 18 and is operable to transport the data cartridges 14 therebetween.

Figure 1:
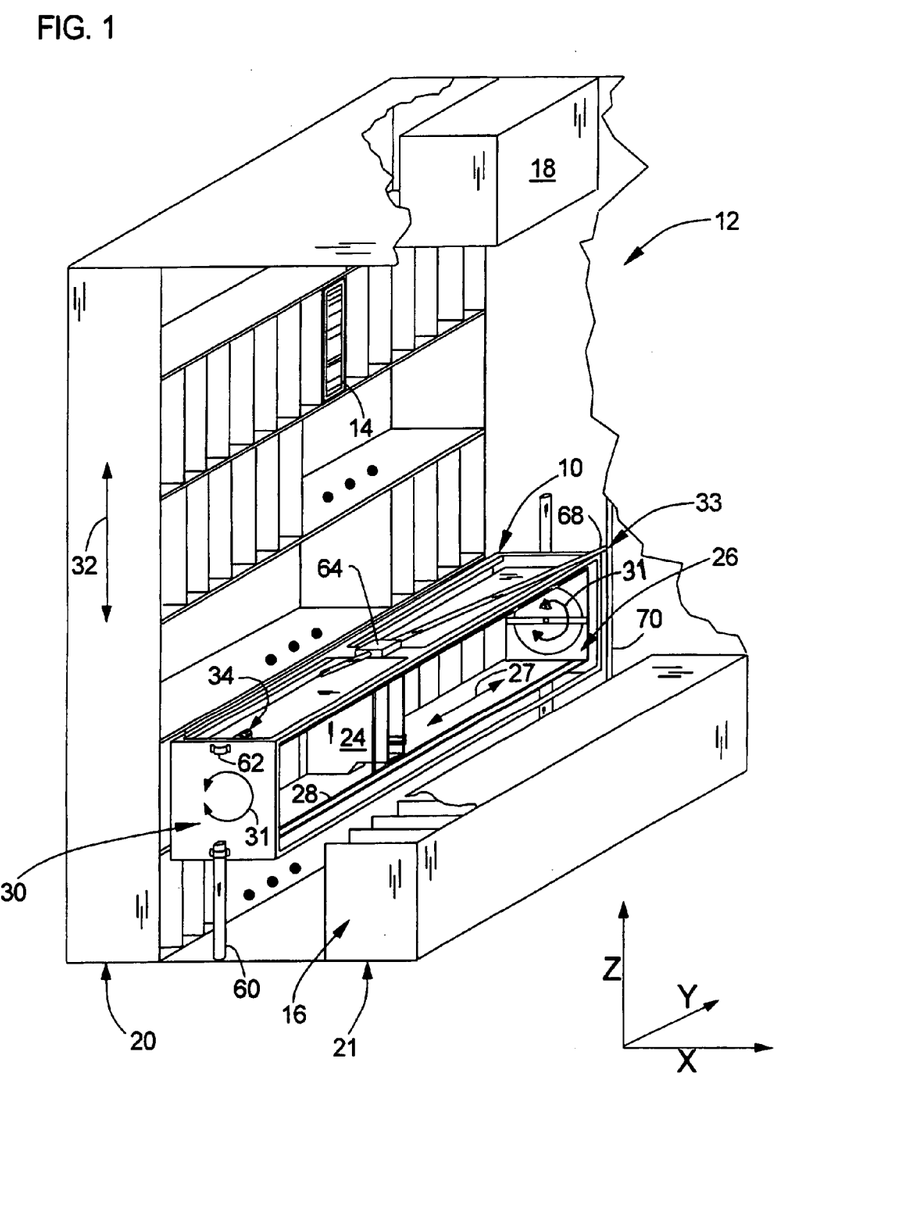
FIG. 1 is a perspective view of one embodiment of a cartridge-handling apparatus as it may be used to store and access data cartridges in a media storage system.

One embodiment of a media storage system 12 is shown in FIG. 1 as it may be used according to the teachings of the invention. In the embodiment shown in FIG. 1, the storage magazines 16 are arranged in two vertical stacks 20, 21 that face toward one other. In addition, one or more read/write devices 18 may also be suitably arranged in the media storage system 12 for read and/or write operations. In the embodiment shown in FIG. 1, a read/write device 18 is shown mounted at the top of the media storage system 12 between the two stacks 20, 21 of storage magazines 16.

The foregoing description of the media storage system 12 is provided in order to better understand one environment in which the cartridge-handling apparatus 10 of the present invention may be used. However, it should be understood that the cartridge-handling apparatus 10 may also be used in conjunction with any of a wide range of other types and configurations of media storage systems, now known or that may be developed in the future. In addition, the coordinates x, y, and z shown in FIG. 1 are provided for purposes of illustration. The coordinates are not fixed in space, but instead are fixed relative to the media storage system 12.

By way of example, although the media storage system 12 is shown with the storage magazines 16 and the read/write device 18 arranged in a particular configuration in FIG. 1, other suitable configurations are also contemplated as being within the scope of the invention. For example, the read/write device 18 may be arranged in one of the stacks 20, 21 so that it faces in the same direction as the storage magazines 16.

It is further noted that the number and arrangement of the storage magazine(s) 16 and the read/write device(s) 18 in the media storage system 12 may depend upon various design considerations. Such considerations may include, but are not limited to, the frequency with which data is accessed by one or more users of the media storage system 12. That is, fewer storage magazines 16 and/or more read/write devices 18 may be provided when the users require frequent access to the data. Likewise, more storage magazines 16 and/or fewer read/write devices 18 may be provided when the users require less frequent access to the data. Other considerations may include the desired dimensions of the media storage system.

In addition, it is noted that the media storage system 12 is not limited to use with any particular type or style of read/write device(s) 18 or storage magazine(s) 16. For example, while the read/write device 18 may be a multi-capacity drive (i.e., configured to receive two or more data cartridges 14 therein), in other embodiments, the read/write device 18 may be a single-capacity drive. Similarly, the storage magazines 16 may have any suitable number of storage chambers or "slots" formed therein for receiving data cartridges 14.

Nor is the media storage system 12 limited to use with any particular type or style of storage media. The media storage system 12 is illustrated herein as it may be used with magnetic storage media (i.e., data cartridges 14), and more particularly, for use with digital linear tape (DLT) or linear tape open (LTO) data cartridges. However, any suitable storage media may be used according to the teachings of the invention, such as, but not limited to magnetic disk or tape, optical media, etc. It is also noted that the term "cartridge" as used herein (e.g., as in cartridge-handling apparatus 10) is not intended to be limited to use with data cartridge media, but may also be used any other suitable media.

The media storage system 12 of FIG. 1 is also provided with a cartridge-handling apparatus 10. According to one embodiment, the cartridge-handling apparatus 10 may comprise a cartridge-engaging assembly 24, a translate frame 26, and a carriage 30. Briefly, the carriage 30 is mounted in the media storage system 12 so that it can be raised and lowered in the directions of arrows 32. The translate frame 26 is pivotally mounted to the carriage 30 (also see FIG. 5), so that it may be rotated in the directions of arrows 31. The cartridge-engaging assembly 24 is mounted in the translate frame 26 so that it moves up and down with the carriage 30, rotates with the translate frame 26, and may be laterally moved in the directions generally illustrated by arrows 27.

Figure 6:
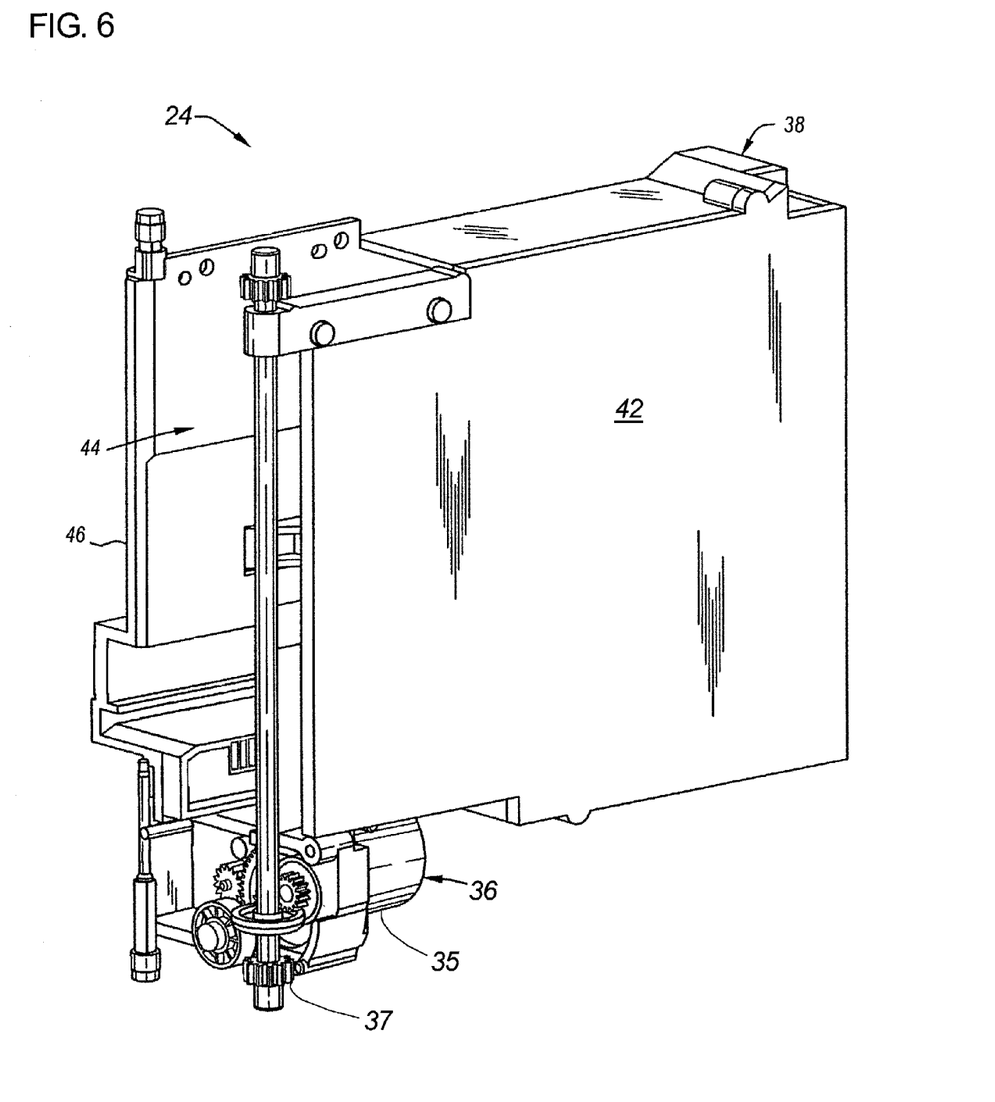
FIG. 6 is a perspective view of an embodiment of a cartridge-engaging assembly for use with the cartridge-handling apparatus.
Figure 7:
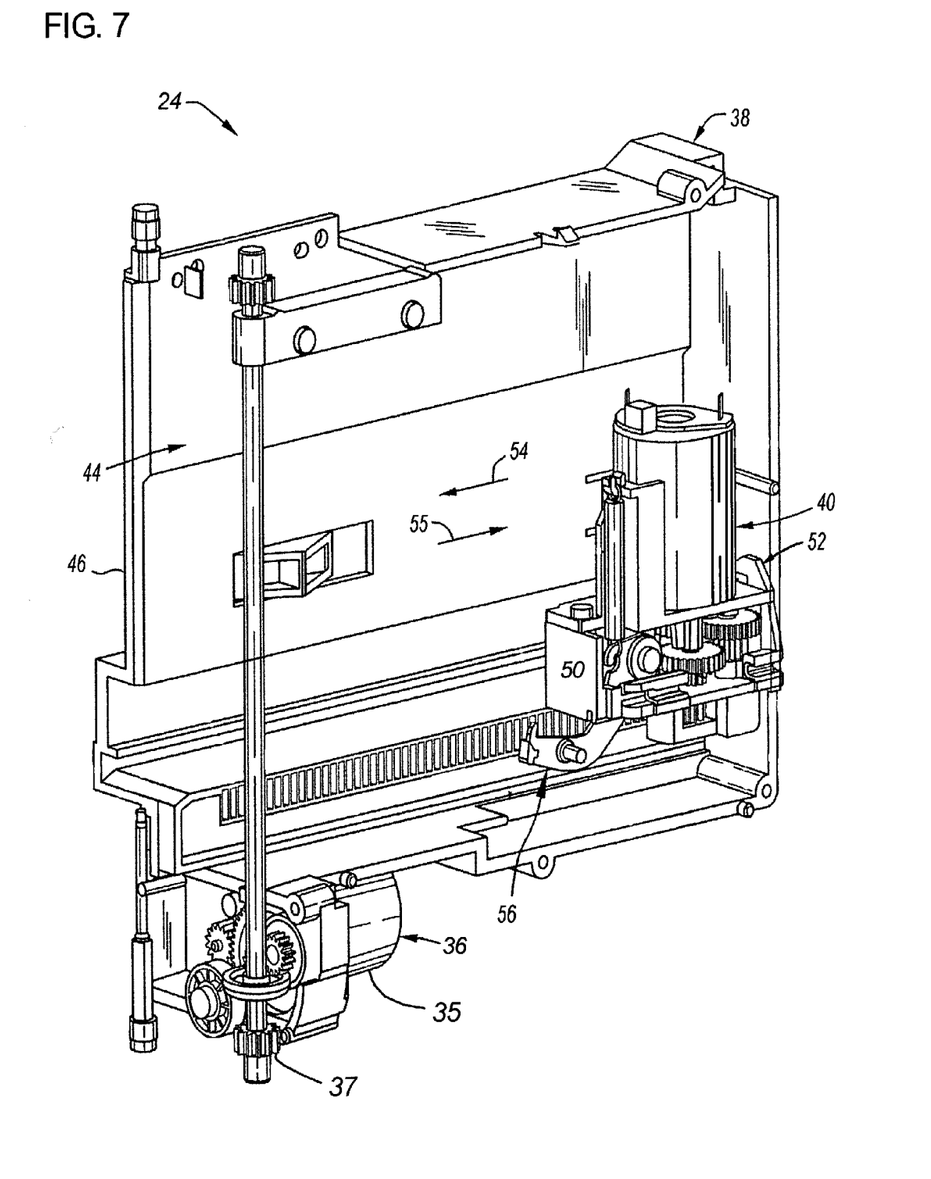
FIG. 7 is a perspective view of the cartridge-engaging assembly shown in FIG. 6 having a side member removed to show a plunge mechanism therein.

An embodiment of a cartridge-engaging assembly 24 will be described in more detail below with respect to FIG. 6 and FIG. 7. For now it is enough to understand that the cartridge-engaging assembly 24 is adapted to access (i.e., retrieve and eject) a data cartridge 14 so that it can be transported between the storage magazines 16 and the read/write device 18 when the cartridge-handling apparatus 10 is moved in the media storage system 12.

The cartridge-handling apparatus 10 may be mounted in the media storage system 12 according to one embodiment of the invention as follows. At least one vertical guide 60 (e.g., a pole or cylinder, an "I-beam", etc.) may be mounted to the media storage system 12 so that it defines a vertical displacement path on the z-axis (e.g., between the floor and the lid of the media storage system 12). One or more brackets 62 may be mounted on the sides of the carriage 30 to slidably engage the vertical guide(s) 60 when the cartridge-handling apparatus 10 is mounted in the media storage system 12. Accordingly, the cartridge-handling apparatus 10 may travel along the vertical displacement path defined by the vertical guide(s) 60 in the media storage system 12.

The vertical guides 60 and brackets 62 may be made of any suitable material. Preferably, the vertical guides 60 and/or the brackets 62 are coated with a low-friction material (e.g., TEFLON®) so as to readily slide relative to one another. Other embodiments of the vertical guide system are also contemplated as being within the scope of the invention. For example, a wheel or bearing assembly (not shown) may be provided to define the vertical displacement path in the media storage system 12. Yet other vertical guide systems are well-understood and can be readily adapted for use with the present invention by one skilled in the art after having become familiar with the teachings of the invention.

Figure 2:
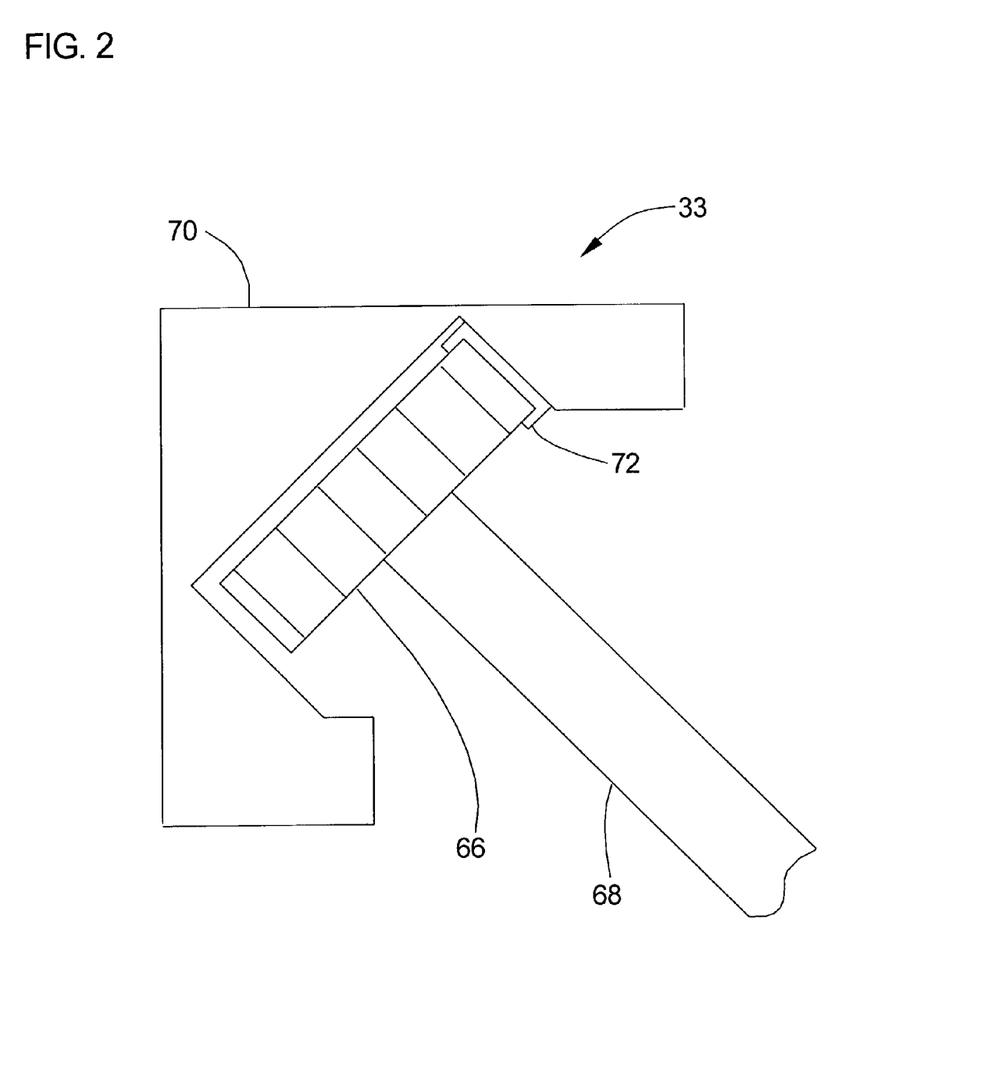
FIG. 2 is a plan view showing a portion of an embodiment of a lift system for use with the cartridge-handling apparatus.

A lift system 33 may be provided for the cartridge-handling apparatus 10 and operated to move the carriage 30 through the vertical displacement path. In one embodiment, the lift system 33 may comprise a drive motor 64 mounted to the carriage 30. The drive motor 64 may be linked by one or more drive shafts 68 to a gear assembly 66, which in turn engages a guide track 70 mounted to the media storage system 12. In one embodiment, the gear assembly 66 may engage gear teeth 72 in the guide track 70, as best seen in FIG. 2. Accordingly, when the drive motor 64 is operated, it causes the carriage 30, and hence the translate frame 26 and cartridge-engaging assembly 24 mounted thereto, to travel along the vertical displacement path in the media storage system 12.

It is understood that other embodiments for mounting the cartridge-handling apparatus 10 in the media storage system 12 for vertical translation therein are also contemplated as being within the scope of the invention. For example, other suitable guide systems and lift systems are readily available and it would be well-understood by one skilled in the art, after having become familiar with the teachings of the invention, to provide one or more such guide systems and/or lift systems for use with the cartridge-handling apparatus 10 of the present invention. For example, the cartridge-handling apparatus 10 may be driven by a pulley system, wherein the pulley wheels may be mounted in the media-storage system 12 and a belt or chain extending therebetween may be operatively associated with the carriage 30 to move it through the vertical displacement path. Yet other embodiments are also contemplated as being within the scope of the invention.

Figure 3:
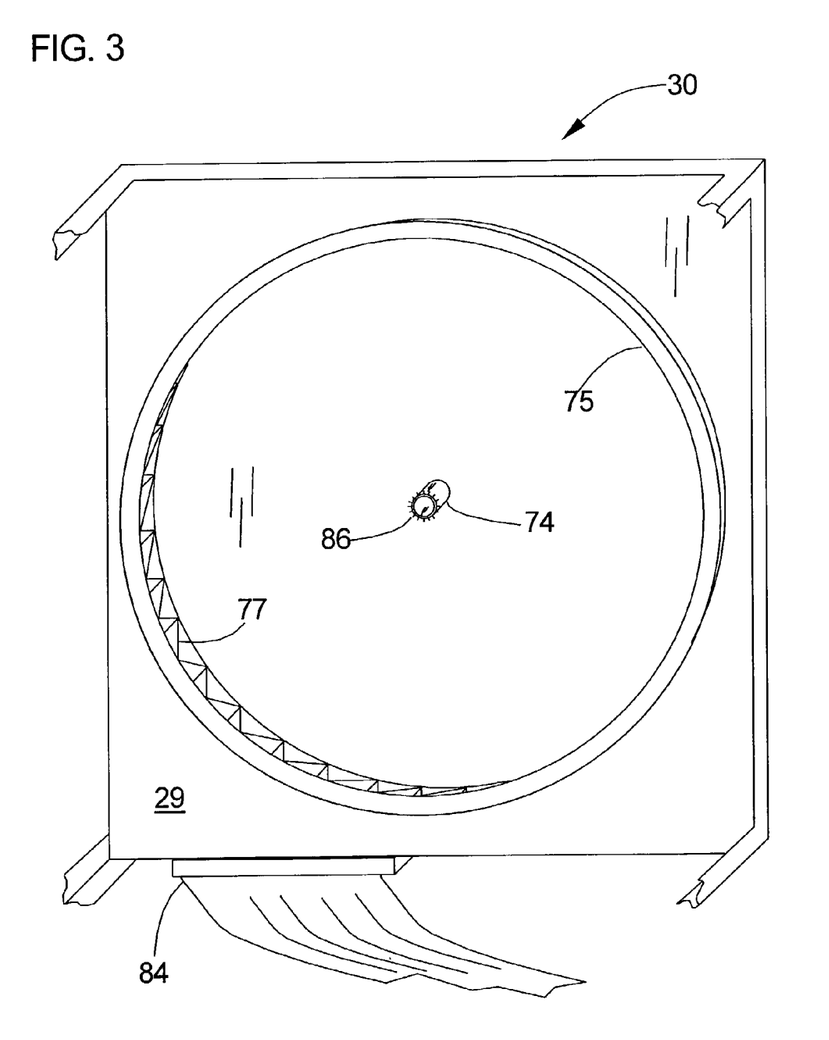
FIG. 3 is a partial perspective view showing an embodiment of a carriage for use with the cartridge-handling apparatus.
Figure 4:
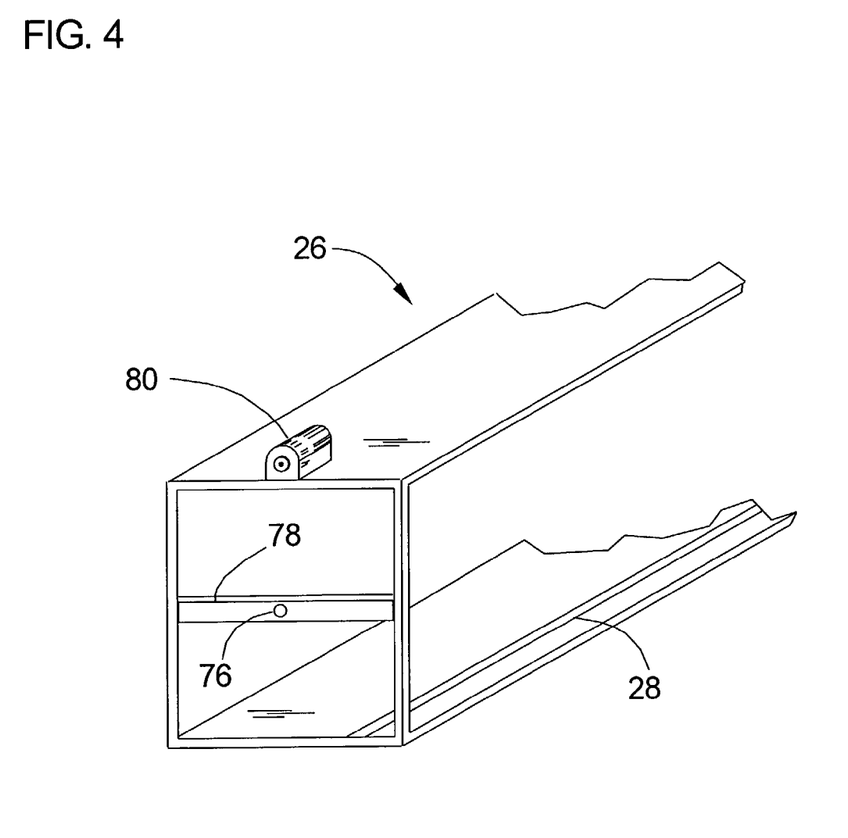
FIG. 4 is a partial perspective view showing an embodiment of a translate frame for use with the cartridge-handling apparatus.

According to one embodiment of the invention, the translate frame 26 is pivotally mounted to the carriage 30 so that it can be rotated in the media storage system 12 in the directions illustrated by arrows 31. More specifically, a pivot connection 74 may be formed on each of the two side panels 29 of the carriage 30, as best seen in FIG. 3, and a mating hole or opening 76 may be formed through a bracket member 78 on the translate frame 26, as best seen in FIG. 4. Thus, the translate frame 26 may be pivotally mounted to the carriage 30 by inserting the pivot connection 74 on each of the two side panels 29 of the carriage 30 through the openings 76 formed on either end of the translate frame 26.

Figure 5:
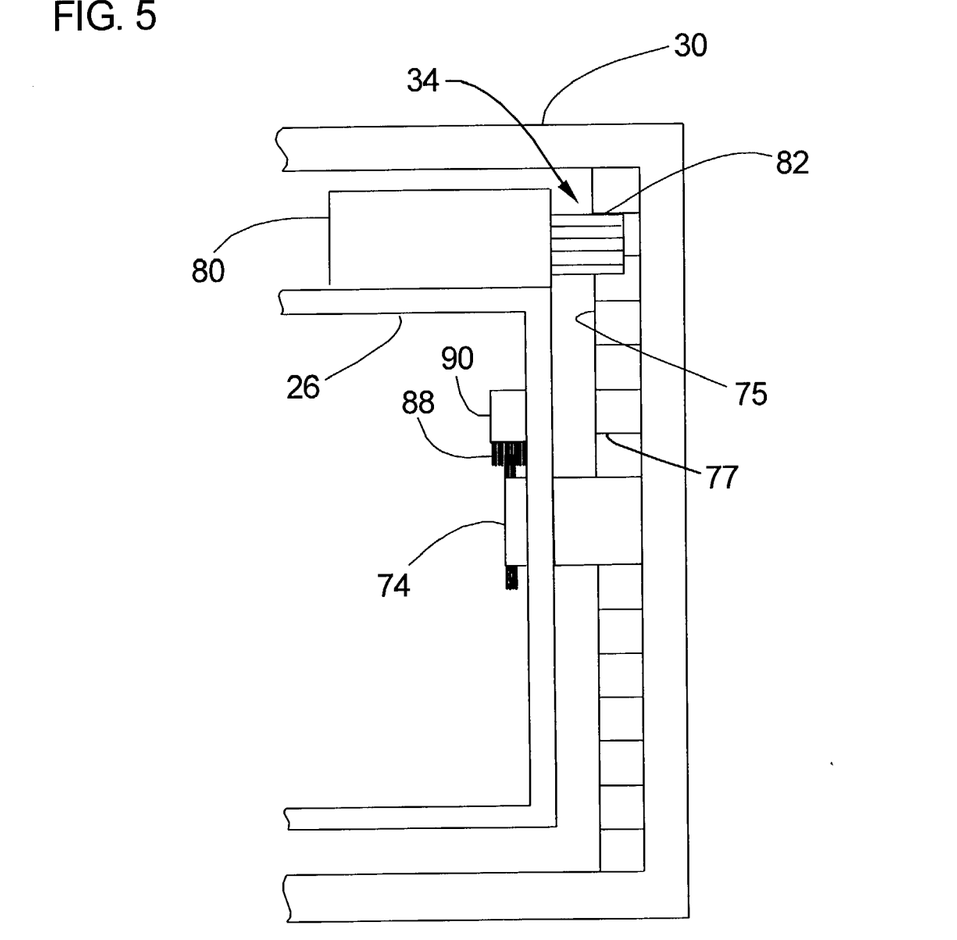
FIG. 5 is a partial side view of the cartridge-handling apparatus showing the carriage pivotally mounted to the translate frame according to one embodiment.

The translate frame 26 is shown pivotally mounted according to this embodiment of the invention in FIG. 5.

It is understood that the pivot connection 74 may instead be formed on the translate frame 26 and the mating hole 76 formed through the side panels 29 of the carriage 30. In addition, other embodiments for pivotally mounting the translate frame 26 to the carriage 30 are also contemplated as being within the scope of the invention, and can be readily implemented with the cartridge-handling apparatus 10 by one skilled in the art after having becoming familiar with the teachings of the present invention.

The cartridge-handling apparatus 10 may also be provided with a rotational drive system 34, as best seen in FIG. 5. According to one embodiment, the rotational drive system 34 may comprise a gear ring 75 that is mounted to at least one of the side panels 29 of the carriage 30 (FIG. 3), and a drive motor 80 that is mounted to the translate frame 26 (FIG. 4). The drive motor 80 may be operatively associated with a gear assembly 82 that engages teeth 77 (FIGS. 3 and 5) on the gear ring 75 when the translate frame 26 is assembled within the carriage 30, as described above. Accordingly, the drive motor 80 may be operated to rotate the gear assembly 82 and the gear ring 75, which causes the translate frame 26 to rotate relative to the carriage 30 in the directions illustrated by arrows 31 (FIG. 1).

According to one embodiment of the invention, the cartridge-handling apparatus 10 may also comprise an electrical connection between the carriage 30 and the translate frame 26 (e.g., for drive motor 80). Electrical current and/or signals may be provided (e.g., from a power source for the media storage system 12) to the carriage 30 via a ribbon cable 84, as shown in FIG. 3. The ribbon cable may be linked to a first brush track 86 on the pivot 74 of the carriage 30. When the translate frame 26 is mounted to the carriage 30, a second brush track 88 provided on the translate frame 26 may contact the first brush track 86 and form an electrical connection between the carriage 30 and the translate frame 26. Suitable links (e.g., wires or cables) may be routed between the brush track 88 (e.g., from a suitable connection block 90) and the various components on the translate frame 26 to supply electrical current and/or signals thereto, even as the translate frame 26 rotates relative to the carriage 30.

It is noted that other connections may also be provided for supplying electrical current and/or signals to the various components on the translate frame 26, such as infrared (IR) or radio frequency (RF) signals. In another embodiment, the electrical connection may be established when the translate frame 26 is in one or more predetermined orientations (e.g., facing a storage magazine 16 and the read/write device 18), but is disconnected during rotation of the translate frame 26. Yet other embodiments are also contemplated as being within the scope of the invention.

An embodiment of the cartridge-engaging assembly 24 that may be used according to the teachings of the invention will now be discussed in more detail with reference to FIG. 6 and FIG. 7. The cartridge-engaging assembly 24 may comprise a housing 38 that defines a cavity 44 sized to receive the data cartridge 14. A plunge mechanism or "thumb assembly" 40 is also seen in the cavity 44 when one of the side panels 42 is removed from the housing 38, as shown in FIG. 7. The plunge mechanism 40 is slidably mounted to the housing 38 and may comprise a drive assembly 52 for moving the plunge mechanism 40 toward and away from the cartridge-access end 46 of the housing 38, generally in the directions indicated by arrows 54 and 55, respectively. The plunge mechanism 40 may also comprise a picker 56 and a surface 50 for engaging the data cartridge 14. Accordingly, the cartridge-engaging assembly 24 is adapted to engage a data cartridge 20, withdraw the data cartridge 20 (e.g., from storage magazine 14) into the chamber 44 formed in the cartridge-engaging assembly 24 for transport within the media storage system 12, and to eject the data cartridge 20 toward the intended destination (e.g., into the read/write device 18).

The cartridge-engaging assembly may be operatively associated with a lateral positioning system as follows to move the cartridge-engaging assembly 24 along a horizontal displacement path 27. In one embodiment, the cartridge-engaging assembly may comprise an actuator assembly 36 having a drive motor operatively associated with a gear assembly 37 for moving the cartridge-engaging assembly 24 laterally as follows. According to one embodiment, a lateral guide 28 defines a horizontal displacement path 27 in the translate frame 26 (FIG. 1 and FIG. 4). The lateral guide 28 may comprise a gear track and the cartridge-engaging assembly 24 may be mounted to the lateral guide 28 so that the gear assembly 37 engages the lateral guide 28. Accordingly, the drive motor 35 may be operated to move the cartridge-engaging assembly 24 toward the front or the back of the media storage system 12 so that it is positioned adjacent the read/write device 18 or one of the slots in the storage magazine 16 to retrieve or eject the desired data cartridge 14.

It is noted that a wide range of cartridge-engaging assemblies, now known or that may be developed in the future, are contemplated as being within the scope of the invention. Consequently, the cartridge-handling apparatus 10 of the present invention should not be regarded as being limited to use with the particular cartridge-engaging assembly 24 shown and described herein. In addition, any number of cartridge-engaging assemblies may be provided for use with the media storage system 12 according to the teachings of the invention. For example, the cartridge-handling apparatus 10 may have two or more cartridge-engaging assemblies mounted therein, thereby providing faster access to the data cartridges 14.

Before describing the operation of the cartridge-handling apparatus 10, it should be noted that the components of the cartridge-handling apparatus 10 may be fabricated from any of a wide range of materials suitable for the intended application. By way of example, the translate frame 26 and the carriage 30 may be fabricated from sheet metal, and the frame assembly 31 of the cartridge-engaging assembly 24 may be fabricated from plastic. However, the present invention should not be regarded as limited to being fabricated from any particular material(s).

It should also be noted that the cartridge-handling apparatus 10 may also house various ancillary devices, such as power supplies, electronic controls, and data processing systems, as are commonly associated with media storage systems.

The cartridge-handling apparatus 10 may be operated to access and transport data cartridges 14 in the media storage system 12 according to one embodiment of the invention as follows. Briefly, when a user makes a request to access a particular data cartridge 14, a signal is delivered to the control system (not shown) for positioning the cartridge-handling apparatus 10. The control system signals the various drive systems of the cartridge-handling apparatus 10 to position it in the media storage system 12 adjacent the storage magazine 14 where the data cartridge 14 is stored. Once retrieved from the storage magazine 14, the control system moves the cartridge-handling apparatus 10 in the media storage system 12 so that it is adjacent the read/write device 18. The data cartridge 14 is then ejected into the read/write device 18 for access to the data stored thereon by the user. Following the read/write operation, the control system may signal the cartridge-handling apparatus 10 to retrieve the data cartridge 14 from the read/write device 18 and return it to the storage magazine 16.

More specifically, when the cartridge-handling apparatus 10 is to be moved to another location in the media storage system 12, the control system delivers a signal to the cartridge-handling apparatus 10 to activate the lift system 33, the rotational drive system 34, and/or the actuator system 36 on the cartridge-engaging device 24, as necessary to position the cartridge-handling apparatus 10 at the desired location. For example, the carriage 30 may be raised or lowered in the media storage system 12 to retrieve the desired data cartridge 14 from an upper or lower storage chamber in one of the storage magazines 16. In addition, the translate frame 26 may be rotated relative to the carriage 30 so that the cartridge-engaging assembly 24 faces one of the stacks 20, 21 of storage magazines 16 or the read/write device 18. Furthermore, the cartridge-engaging assembly 24 may be moved toward the front or the back of the media storage system 12 to position the cartridge-engaging assembly 24 adjacent the desired chamber in the storage magazine 16 or one of the drives of the read/write device 18.

In one embodiment, vertical movement of the cartridge-engaging assembly 24 is the result of the lift system 33 (FIG. 1 and FIG. 2). The lift system 33 may be operated to raise or lower the carriage 30, and hence the cartridge-engaging assembly 24. More specifically, the drive motor 64 may be operated to rotate the gear assembly 66 operatively associated therewith. The gear assembly 66 engages the lift track 72 and the cooperative action thereof moves the carriage 30 through the vertical displacement path defined by the vertical guides 60 in the media storage system 12. Depending on the direction of rotation of the drive motor 70 (e.g., clockwise or counter-clockwise), the carriage 30, and hence the cartridge-engaging assembly 24, is either raised or lowered in the media storage system 12. Once the cartridge-engaging assembly 24 is positioned at the desired level or on the desired plane in the media storage system 12, the drive motor 64 is shut off or otherwise disengaged.

Rotation of the cartridge-engaging assembly 24 is a result of the rotational drive system 34 (FIG. 1 and FIG. 5). The rotational drive system 34 may be operated to rotate the translate frame 26 relative to the carriage 30, thus orienting the cartridge-access device 24 to face in different directions. Accordingly, the cartridge-engaging assembly 24 may be rotated to face in at least two orientations. For example, the cartridge-engaging assembly 24 may be used to retrieve a data cartridge 14 from one side of the media storage system 12 (e.g., stack 20), and then rotated so that it faces the read/write device 18 orientated at the top of the media storage system 12 or in the other stack 21 for delivery of the data cartridge 14.

Although the following description is primarily directed to one side of the cartridge-handling apparatus 10, identical events and functions may also occur with respect to the other side of the cartridge-handling apparatus 10. Alternatively, the other side of the cartridge-handling apparatus 10 may pivot as the first side is driven to rotate.

More specifically, the drive motor 80 may be operated to rotate the gear assembly 82 operatively associated therewith, which engages the gear teeth 77 in the gear ring 75 on the carriage 30. Depending on the direction of rotation of the drive motor 70 (e.g., clockwise or counter-clockwise), the translate frame 26 is rotated in one direction or the other relative to the carriage 30. For example, the cartridge-handling apparatus 10 may be rotated so that the cartridge-engaging assembly 24 faces either of the opposing storage magazines 16, or the read/write device 18 mounted near the top of the media storage system 12. Once the cartridge-engaging assembly 24 is positioned to face in the desired direction in the media storage system 12, the drive motor 80 is shut off or otherwise disengaged.

It is noted that the cartridge-handling apparatus 10 may be rotated through any number of partial or complete revolutions. In one embodiment, the cartridge-handling apparatus 10 may be rotated at least 180 degrees about the y-axis in the media storage system 12. For example, the cartridge-handling apparatus 10 may face the first stack 20 of storage magazines 16, and be rotated 180 degrees to face the second stack 21 of storage magazines 16. In another embodiment, the cartridge-handling apparatus 10 may be rotated at least 360 degrees. For example, the cartridge-handling apparatus 10 may face the first stack 20 of storage magazines 16, be rotated 180 degrees to face the second stack 21 of storage magazines 16, and then rotated another 180 degrees in the same direction to again face the first stack 20 of storage magazines 16. However, other embodiments are also contemplated as being within the scope of the invention. For example, the cartridge-handling apparatus 10 may be rotated through more than 360 degrees or limited to rotation through fewer than 180 degrees.

Lateral movement of the cartridge-engaging assembly 24 is a result of the cooperative action of the actuator 36 (FIG. 6) along the lateral guide 28 in the translate frame 26 (FIG. 1 and FIG. 4). More specifically, the drive motor 35 may be operated to rotate the gear assembly 82 operatively associated therewith. The gear assembly 82 engages a gear track in the lateral guide 28, and depending on the rotation of the drive motor 35 (e.g., clockwise or counterclockwise), the cartridge-engaging assembly 24 is moved in one direction or the other along the lateral displacement path 27. Accordingly, the cartridge-engaging assembly 24 may be positioned adjacent the desired storage slot in one of the storage magazines 16, or the read/write device 18, as the case may be.

Once the cartridge-handling apparatus 10 has been positioned to face in the desired direction in the media storage system 12, the cartridge-engaging assembly 24 may be operated to retract or eject a data cartridge 14. In one embodiment, the plunge mechanism 40 is moved toward the cartridge access end 46 of the housing 38 to engage the data cartridge 14, generally in the direction indicated by arrow 54 (FIG. 7). Once engaged, the plunge mechanism 40 may be moved away from the cartridge access end 46 of the housing 38 to retract the data cartridge 14 into the chamber 44 of the cartridge-engaging assembly 24. The cartridge-handling apparatus 10 may then be repositioned to transport and deliver the data cartridge 14 to another destination in the media storage system 12.

After the cartridge-handling apparatus 10 has been repositioned, the cartridge-engaging assembly 24 may eject the data cartridge 14 toward the desired position by operating the plunge mechanism 40 to move toward the cartridge access end 46 of the housing 38. The surface 50 pushes on the edge of the data cartridge 14 and causes the data cartridge 14 to be ejected from the cartridge-engaging assembly 24. Once ejected, the plunge mechanism 40 may be retracted away from the cartridge access end 46 so that the cartridge-handling apparatus 10 may be moved in the media storage system 12 without interfering with such movement.

Figure 8A:
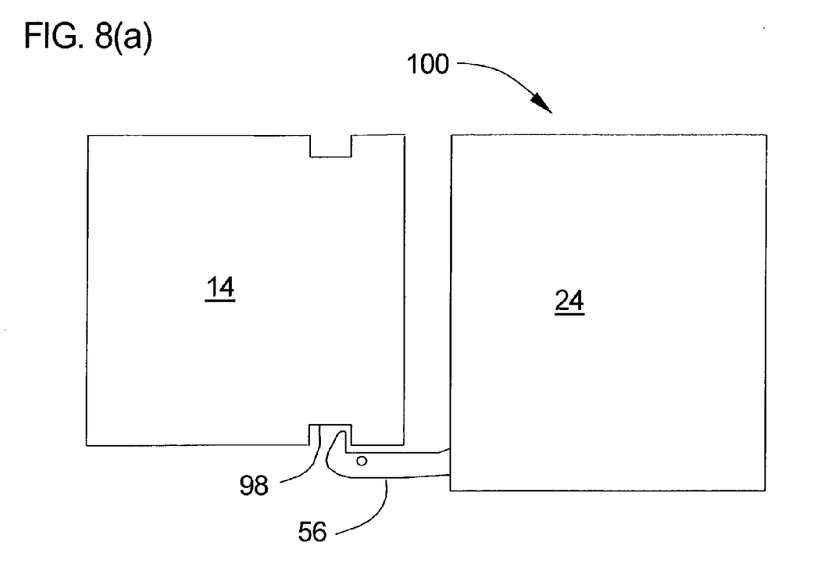
FIGS. 8(a) and 8(b) are simplified side views illustrating the cartridge-engaging assembly accessing a data cartridge (a) in one orientation, and (b) in another orientation according to one embodiment.
Figure 8B:
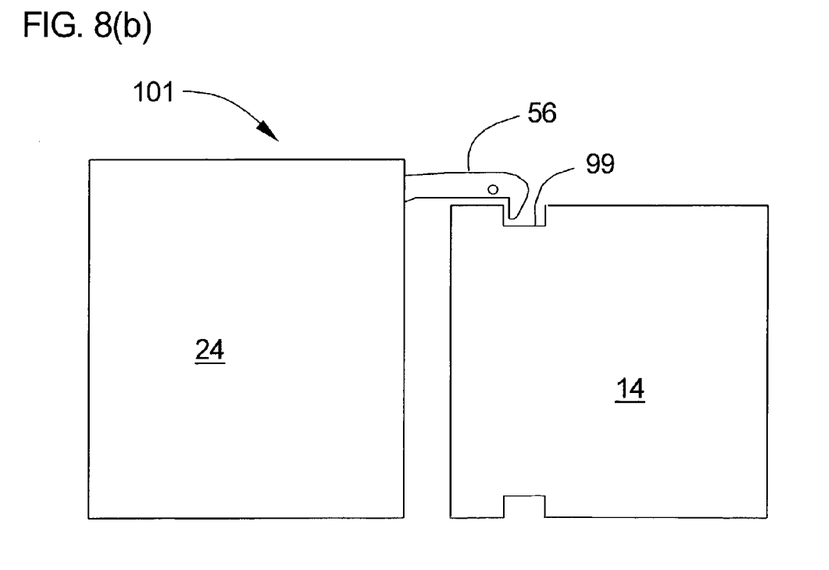

It is readily apparent that rotating the translate frame 26 relative to the carriage 30 causes the cartridge-engaging assembly 24 to be oriented in different directions. As an illustration, the cartridge-engaging assembly may be mounted to the translate frame 26 so that the cartridge access end 44 faces left and the plunge mechanism 40 is at the bottom (e.g., as shown in FIG. 6 and FIG. 7). Accordingly, when the cartridge-engaging assembly 24 engages data cartridges 14 from the right-facing stack 20, it is in a first orientation 100 as shown in FIG. 8(a). That is, the picker 56 engages the data cartridge 14 at the bottom (e.g., at notch 98 formed on the bottom of the data cartridge 14). When the translate frame 26 is rotated so that the cartridge-engaging assembly 24 faces the other stack 21 of storage magazines 16, the cartridge-engaging assembly 24 is in a second orientation 101 as shown in FIG. 8(b). That is, the picker 56 engages the data cartridge 14 at the top (e.g., at notch 99 formed on the top of the data cartridge 14).

It is noted that the cartridge-engaging assembly 24 may be oriented in any number of directions and is not limited to the orientations illustrated in FIG. 8(a) and FIG. 8(b). For example, the cartridge-engaging assembly 24 may be oriented orthogonal to that shown in FIG. 8(a) and FIG. 8(b) when the translate frame 26 is rotated so that the cartridge-engaging assembly 24 faces the read/write device 18 mounted near the top of the media storage system 12.

It should be understood that the operation of the cartridge-handling apparatus 10 is not limited to any particular order. For example, the carriage 30 may be raised or lowered in the media storage system 12 simultaneously with rotation of the translate frame 26. Alternatively, the translate frame 26 may be rotated prior to raising the carriage 30.

What is claimed is:

1. A cartridge-handling apparatus for a media storage system, comprising:
    a carriage;
    a translate frame pivotally mounted to said carriage;
    a rotational drive system operatively associated with said carriage, said rotational drive system rotating said translate frame about a first axis with respect to the carriage; and
    at least one cartridge-engaging assembly mounted in said translate frame,
    the cartridge-engaging assembly translatable along the first axis with respect to said translate frame,
    wherein the translate frame has a chamber, the cartridge-engaging assembly translatable along the first axis inside the chamber of the translate frame,
    wherein the cartridge-engaging assembly has a chamber to receive a data cartridge.

2. The cartridge-handling apparatus of claim 1, further comprising a lift system operatively associated with said carriage, said lift system positioning said carriage on a second axis in said media storage system, the second axis different from the first axis.

3. The cartridge-handling apparatus of claim 1, further comprising a lateral positioning system operatively associated with said translate frame, said lateral positioning system to translate said at least one cartridge-engaging assembly along said first axis.

4. The cartridge-handling apparatus of claim 1, wherein said cartridge-engaging assembly is adapted to face in at least two different orientations in said media storage system to access a data cartridge.

5. The cartridge-handling apparatus of claim 1, further comprising an electrical connection between said carriage and said translate frame, said electrical connection having a brush track mounted at a pivot between said carriage and said translate frame.

6. The cartridge-handling apparatus of claim 1, wherein said translate frame is rotatable at least 180 degrees about said first axis with respect to the carriage.

7. The cartridge-handling apparatus of claim 1, wherein said translate frame is rotatable at least 360 degrees about said first axis with respect to the carriage.

8. The cartridge-handling apparatus of claim 1, wherein said rotational drive system comprises:
    a gear ring mounted to said carriage; and
    a drive motor mounted to said translate frame.

9. The cartridge-handling apparatus of claim 1, wherein said rotational drive system comprises a gear assembly operable to rotate said translate frame about said first axis in said media storage system.

10. The cartridge-handling apparatus of claim 1, further comprising a lift system to translate the carriage along a second axis different from the first axis.

11. The cartridge-handling apparatus of claim 10, wherein the first axis is a y-axis, and the second axis is a z-axis.

12. The cartridge-handling apparatus of claim 1, wherein the first axis is a y-axis, and wherein the carriage is movable along a z-axis to translate the cartridge-engaging assembly along the z-axis with the carriage.

13. The cartridge-handling apparatus of claim 1, wherein the translate frame is pivotally mounted to the carriage with at least two pivot connections.

14. A cartridge-handling apparatus for a media storage system, comprising:
    a carriage;
    a translate frame pivotally mounted to said carriage;
    a rotational drive system operatively associated with said carriage, said rotational drive system rotating said translate frame about a first axis with respect to the carriage, wherein the translate frame is rotatable with respect to the carriage by at least 180° to face different storage magazine stacks in the media storage system; and
    at least one cartridge-engaging assembly mounted in said translate frame,
    the cartridge-engaging assembly translatable along the first axis with respect to said translate frame,
    wherein the cartridge-engaging assembly has a chamber to receive a data cartridge.

15. The cartridge-handling apparatus of claim 14, further comprising at least two pivot connections between the translate frame and the carriage.

16. A media storage system, comprising:
    at least one storage magazine for storing data cartridges therein;
    at least one read/write device for accessing data on the data cartridges;
    a cartridge-handling apparatus mounted between said at least one storage magazine and said at least one read/write device for transporting the data cartridges therebetween, said cartridge-handling apparatus having a lateral positioning system for moving on a y-axis, and a rotational drive system for rotating about said y-axis, the cartridge handling apparatus further comprising:
        a guide;
        a carriage movable along the guide along a z-axis;
        a translate frame pivotally mounted to the carriage, wherein the rotational drive system is adapted to rotate the translate frame about the y-axis with respect to the carriage; and a cartridge-engaging assembly for engaging a data cartridge in the storage magazine, wherein the cartridge-engaging assembly is movable by the lateral positioning system with respect to the translate frame along the y-axis, wherein the translate frame has a chamber, the cartridge-engaging assembly translatable along the y-axis inside the chamber of the translate frame, wherein the cartridge-engaging assembly has a chamber to receive a data cartridge.

17. The media storage system of claim 16, wherein said cartridge-handling apparatus has a lift system for moving the carriage along the z-axis.

18. The media storage system of claim 16, further comprising at least two stacks of media storage magazines oriented facing one another.

19. The media storage system of claim 16, wherein said cartridge-handling apparatus is adapted to face between at least two orientations to access the data cartridges.

20. The media storage system of claim 16, wherein said cartridge-handling apparatus is rotatable at least 180 degrees about said y-axis.

21. The media storage system of claim 16, wherein said cartridge-handling apparatus is rotatable at least 360 degrees about said y-axis.

22. The media storage system of claim 16, wherein the translate frame is pivotally mounted to the carriage with at least two pivot connections.

23. A media storage system, comprising:
at least one storage magazine for storing data cartridges therein;
at least one read/write device for accessing data on the data cartridges;
a cartridge-handling apparatus mounted between said at least one storage magazine and said at least one read/write device for transporting the data cartridges therebetween, said cartridge-handling apparatus having a lateral positioning system for moving on a y-axis, and a rotational drive system for rotating about said y-axis, the cartridge handling apparatus further comprising:
a guide;
a carriage movable along the guide along a z-axis;
a translate frame pivotally mounted to the carriage, wherein the rotational drive system is adapted to rotate the translate frame about the y-axis with respect to the carriage; and
a cartridge-engaging assembly for engaging a data cartridge in the storage magazine, wherein the cartridge-engaging assembly is movable by the lateral positioning system with respect to the translate frame along the y-axis,
wherein the cartridge-engaging assembly has a chamber to receive a data cartridge.

24. A method of operating a media handling apparatus in a media storage system, the media handling apparatus having a carriage, a frame pivotally mounted to the carriage, and a cartridge-engaging assembly, the method comprising:
moving the carriage along a first axis;
rotating the frame with respect to the carriage along a second axis that is perpendicular to the first axis, wherein rotating the frame with respect to the carriage comprises rotating the frame on at least two pivot connections between the frame and carriage;
moving the cartridge-engaging assembly along the second axis with respect to the frame; and
withdrawing a data cartridge from a storage magazine into a chamber of the cartridge-engaging assembly.

25. The method of claim 24, wherein moving the carriage comprises moving the carriage along a guide along the first axis.

26. The method of claim 24, wherein the frame has a chamber, and wherein moving the cartridge-engaging assembly comprises moving the cartridge-engaging assembly along the second axis inside the chamber of the frame.

* * * * *